H. H. LEWIS.
REINFORCING DRILL TOOL JOINT.
APPLICATION FILED DEC. 14, 1912.
1,101,805. Patented June 30, 1914.
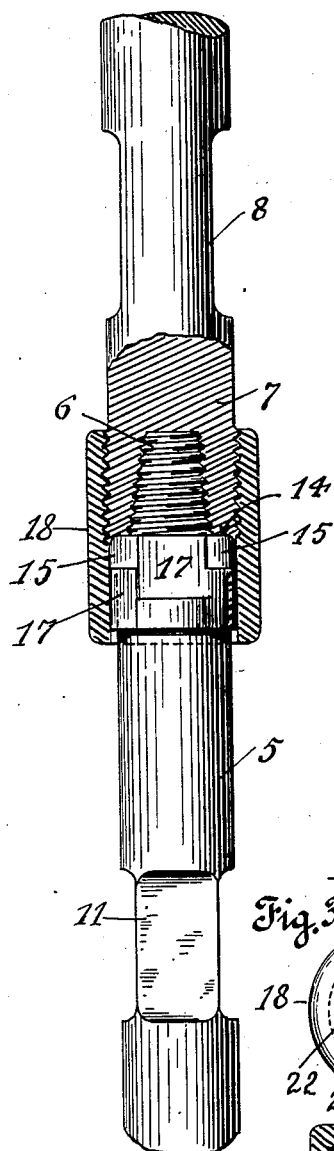
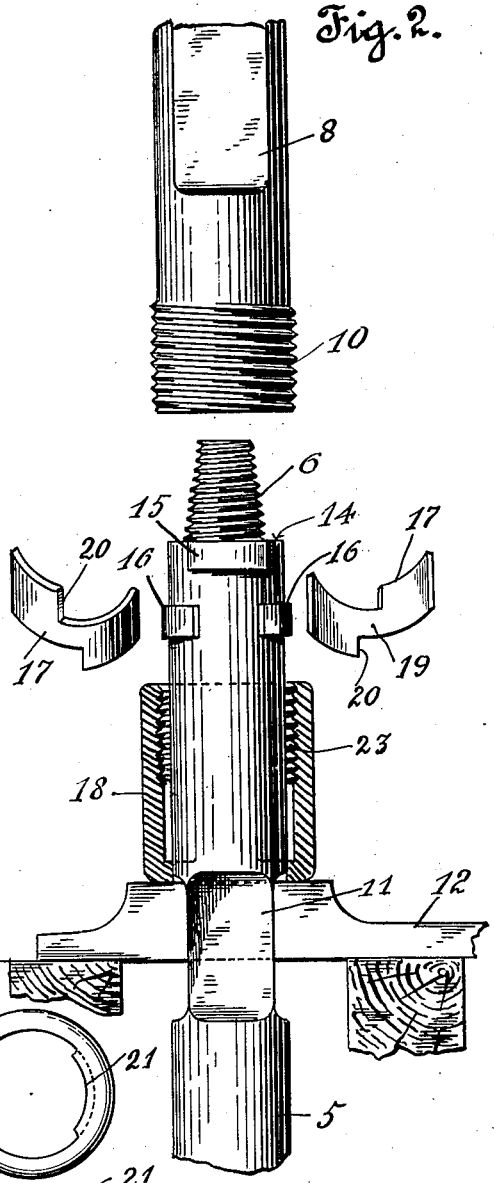
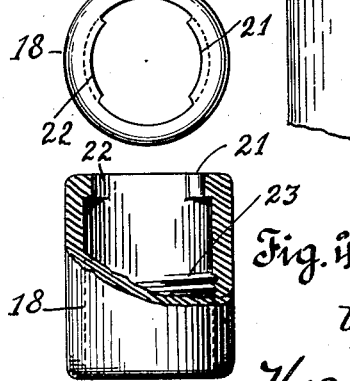

UNITED STATES PATENT OFFICE.

HARRY H. LEWIS, OF BAKERSFIELD, CALIFORNIA.

REINFORCING DRILL-TOOL JOINT.

1,101,805.  Specification of Letters Patent.  Patented June 30, 1914.

Application filed December 14, 1912. Serial No. 736,774.

*To all whom it may concern:*

Be it known that I, HARRY H. LEWIS, a citizen of the United States, residing at Bakersfield, in the county of Kern and State of California, have invented new and useful Improvements in Reinforcing Drill-Tool Joints, of which the following is a specification.

This invention relates to drill tool joints, and especially to devices for reinforcing joints of this character, and the principal object is to provide a reinforcement for the ordinary pin and box joint used in oil well drilling with an easily applied sleeve.

It is also an object to provide means by which the sleeve may be readily applied to the engaging end of one of the members composing the joints, preferably provided with reverse threads to that of the pin and box.

It is a further object to provide a securing sleeve that may pass by the interrupted segments of an annular ring and then applying suitable removable segments to complete the retaining flange and locking them in by the sleeve to form a securing means for the parts.

In the drawings accompanying this specification and forming therewith the application for Letters Patent: Figure 1 is an elevation of the drill rods as connected, a portion of the box being shown in section, together with the securing sleeve. Fig. 2 is a view showing the method of assembling, the lower or pin rod being shown supported by the wrench with the sleeve in section resting on the wrench, and the segments in close proximity to their normal position on the pin rod. Fig. 3 is an end view of the sleeve viewed from the lower or semi-flanged end. Fig. 4 is a detail elevation of the sleeve partly in section to clearly show the interrupted flanges.

Heretofore in the operation of drill tool rods in the drilling of deep wells the ordinary pin and box joint commonly used has not proved strong enough to stand the continued strain and heavy weights frequently applied thereto. This invention overcomes the above difficulty by providing a reinforcement for the joint, which is simple and easy of application, and efficiently prevents the uncoupling at the joint.

More specifically in the drawings numerals are used to designate like parts in the different views, 5 designating the drill rod usually provided with a threaded pin 6 at its upper end of the well known truncated conical form, which is embraced by the box 7 formed on the opposite end of a drill rod 8, the securing threads on these component and engaging portions are shown as right handed threads, as in the common practice. The cylindrical periphery of the box 8 is of slightly greater diameter than the cylindrical portion supporting the pin 6 to provide for the threads 10 cut on its outer periphery and shown as preferably left handed threads.

The rod 5 provided with the pin 6 is provided with the wrench faces 11 by which it is supported and secured in the wrench 12 held on the suitable supporting timbers or floor over the well casing, and the portion of the rod intermediate of the shoulder 14 on which the pin 6 is formed and the wrench surfaces is provided with the interrupted segments 15 and 16, which are segments of two parallel annular flanges formed on the peripheral surface of the cylindrical rod and preferably spaced apart a distance equal to their own width, the outer or peripheral surfaces being formed by a radius corresponding to that forming the unthreaded portion of the cylindrical box 7. Semi-circular segments 17 are provided which fit into the spaces between the interrupted segments 15 and 16, and being of the same thickness they fill in or pad this area so as to form a continuous annular flange on the upper portion of the rod 5 from the lower line of the interrupted segment 16 to the shoulder 14. As stated, these segments are preferably semi-cylindrical in form, their inner surfaces corresponding with the diameter of the cylindrical portion of the rod against which they are held when the sleeve 18 assumes its operative position. The segments 17 could be made in several different forms, but that shown is preferred and consists mainly of two wings connected by the web 19, the shoulders 20 formed next to these webs engaging with the adjacently disposed ends of the segments 15 and 16.

The sleeve 18 is a cylindrical structure having an internal diameter great enough to slide over the segments 15 and 16, and its lower end is provided with two flanges 21 and 22, which are segments of a complete flange and of an arc length equal to the interruption between a pair of the segments 15 or 16, the unflanged portion being such that it will slide over either of the segments 15 or 16 when properly disposed in relation thereto. On the inner, upper and oppositely disposed portion of the periphery from the flanges left handed threads 23 are cut of the same size as the threads 10 on the rod 8, the outer diameter of the sleeve being of any suitable dimension to provide sufficient strength for the weight and strain for which it is intended.

In the assembling of this device particular reference is called to Fig. 2 where the drill rod 5 is shown securely held by the left hand wrench 12 with the depending portion of the rod in the well casing, not shown. It being understood that the segments 17 are removed from the end of the rod the sleeve 18 is now introduced and slipped past the segments 15, the flanges 21 and 22 passing between the ends of the two segments. A quarter of a turn is now given the sleeve and its flanges for passing the lower segments, and the flanges are passed downward between these lower segments 16 and the sleeve is allowed to rest on the wrench. The rod 8 is now brought into position and with a right handed wrench applied to the wrench faces on the rod the box 7 is secured to the pin 6 in the usual and well known manner. The segments 17 are now placed in position next to their respective and registering interrupted segments on the drill rod and the sleeve 18 is slipped up over the latter locking them in position until its internal threads engage with the threads 10 on the rod 8 and the sleeve is turned to the left by any suitable pipe wrench, or wrench faces may be formed thereon, if preferred, until the flanges 21 and 22 take up against the lower edge of the segment 16 and the semicircular segments 17 to form a secure, tight and strong reinforcement for the joint.

What I claim is:

1. A reinforcing drill tool joint, comprising a rod provided with a pin and having interrupted segments on its outer periphery, removable segmental means to secure a sleeve on said pin rod, a threaded sleeve removably secured to said pin rod, and a rod provided with a box and a threaded periphery to engage with said threaded sleeve to complete said joint.

2. A reinforcing drill tool joint, comprising a rod provided with a threaded pin, and interrupted segments on its outer periphery, members to engage said interrupted segments and complete said interrupted segments to form an annular flange, a rod provided with a box and securing means on its periphery, and a sleeve provided with an interrupted flange to engage said annular flange, and means to engage the periphery of said box rod.

3. A reinforcing drill tool joint, comprising a rod provided with a threaded pin and interrupted segments on its outer periphery, semi-circular segments to engage said interrupted segments and complete said interrupted segments to form an annular flange, a rod provided with a threaded box and a threaded exterior periphery, a cylindrical sleeve having interior threads to engage said threaded periphery, and having an interrupted flange extending inwardly on the inner end of the oppositely disposed end from said threaded end, whereby the sleeve may be passed by said interrupted segments and engage said latter when the semi-circular segments are in place.

4. A reinforcing drill tool joint, comprising a rod provided with a threaded pin and interrupted segments on its outer periphery, semi-circular segments to engage said interrupted segments and complete said interrupted segments to form an annular flange, a rod provided with a threaded box and a reversely threaded exterior periphery, a cylindrical sleeve having interior threads to engage said reversely threaded periphery, and having an interrupted flange extending inwardly on the inner end of the oppositely disposed end from said threaded end, whereby the sleeve may be passed by said interrupted segments and engage said latter when the semi-circular segments are in place.

In witness that I claim the foregoing I have hereunto subscribed my name this 3rd day of December, 1912.

HARRY H. LEWIS.

Witnesses:
H. P. SISSON,
R. A. MOORE.